Figure 9:
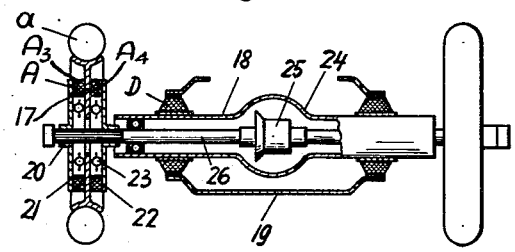

March 19, 1957 B. BARÉNYI 2,785,764
ELASTIC SUSPENSION DEVICES ARRANGED IN SERIES BETWEEN
VEHICLE WHEEL, AXLE AND SUPERSTRUCTURE
Filed March 1, 1952 3 Sheets-Sheet 1
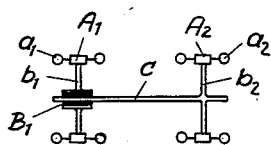
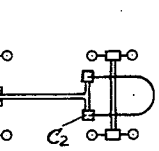
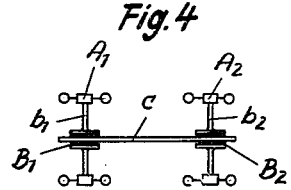
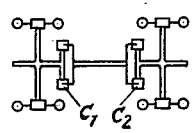
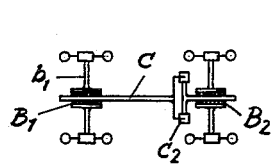
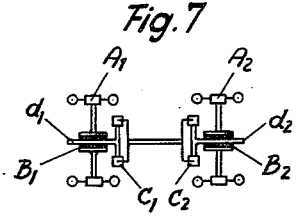
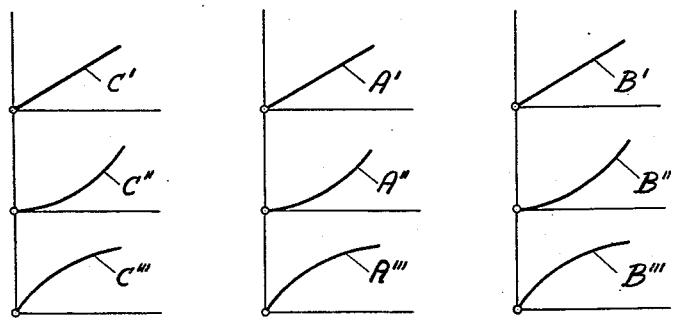
Inventor
Béla Barényi
By Dicke and Padlon
Attorneys March 19, 1957  B. BARÉNYI  2,785,764
ELASTIC SUSPENSION DEVICES ARRANGED IN SERIES BETWEEN
VEHICLE WHEEL, AXLE AND SUPERSTRUCTURE
Filed March 1, 1952  3 Sheets-Sheet 3

Inventor
Béla Barényi
By Micke and Padlon
Attorneys.

United States Patent Office 2,785,764
Patented Mar. 19, 1957

2,785,764

ELASTIC SUSPENSION DEVICES ARRANGED IN SERIES BETWEEN VEHICLE WHEEL, AXLE, AND SUPERSTRUCTURE

Bela Barenyi, Stuttgart-Rohr, Germany, assignor to Daimler-Benz Aktiengesellschaft, Stuttgart-Untertürkheim, Germany Application March 1, 1952, Serial No. 274,415

Claims priority, application Germany March 3, 1951

18 Claims. (Cl. 180—73)

The present invention relates to a spring suspension unit for vehicles, particularly for motor vehicles, using a wheel spring suspension unit, which acts in the plane of the wheel and which is made particularly of rubber.

Spring suspension units in accordance with the present invention have the advantage that they result in a particularly small unsuspended mass, since the interior part of the wheel with the hub, brake drum, etc., may already belong to the suspended parts of the vehicle. Furthermore, such spring suspensions absorb shocks in every direction within the plane of the wheel. The vehicle thereby adheres closely to the unevennesses of the roadway in a most favorable manner. At the same time a spring suspension in accordance with the present invention is also effective in a soundproofing manner.

It is one object and feature of the present invention to provide a spring suspension unit which is also available for universal use and to render feasible the use thereof with heavy vehicles, in which such a yieldingness between the wheel and frame is insufficient as a rule, particularly on highly uneven roadways, so as to permit the wheels to follow every unevenness of the roadway.

It is a further object of the present invention to improve the entire suspension characteristics and qualities of the vehicle and to provide for that purpose a supplementary spring suspension in addition to the aforementioned wheel spring suspension unit, or to adapt such additional supplementary suspension in all its qualities to the qualities of the wheel spring suspension unit, so that a particularly good over-all vehicle spring suspension results therefrom.

A further object of the present invention consists in the fact that not only the additional yieldingness provided by the supplementary suspension, but, in a given case, the entire suspension consisting of the hub suspension and the additional yieldingness of the supplementary suspension may also have a substantially smaller suspension stroke in the vertical direction than is normally provided between wheel and frame. However, the normal suspension can also be retained, if so desired.

According to a special feature of the present invention, the additional yieldingness produced by the supplementary suspension is provided in such a manner that it effects a yieldingness principally around one axis or in one direction, whereby preferably it permits, however, a simultaneous relatively slight yieldingness in all directions, particularly with the use of rubber members. On the one hand, a favorable stability and, on the other hand, a silenced, shock-absorbing connection between the wheel axle and the frame is assured thereby. The yieldingness may for example, be provided around a longitudinal axis and/or around a transverse axis. In the first case, the wheels can follow to a very high degree one-sided, large unevennesses of the road by oppositely directed movements of the stroke of the wheels, whereby, however, the tilting motion of the axis is limited as a result of the simultaneous arrangement of the hub suspension. In the second case, unidirectional movements of the stroke of the wheels are absorbed very softly, while at the same time, a particularly good stability in curves can be achieved. In both cases, above all, the simultaneously provided wheel or hub suspension effects that a sufficient suspension also exists in the other directions.

A yieldingness or suspension around a longitudinal axis and around a transverse axis may also be provided for. In that case, the individual yieldingness of the supplementary suspensions can be kept particularly small, and practically every desired suspension quality may be achieved by appropriate selection of the rating of each individual yieldingness. Simultaneously therewith, the double yieldingness effectively provides that wheel and frame or wheel axle and frame are additionally insulated against one another. The additional yieldingness of the supplementary suspension may also act mainly transversely to the driving direction, if so desired.

The present invention may be utilized both for independently guided wheels and for rigid axles or similar constructions. It is of particular significance in connection with rigid axles, as it renders possible very simple constructions. The additional yieldingness can be provided for at the front axle or at the rear axle of the vehicle or at both wheel axles. According to a further feature of the present invention, the driving aggregate may be located in a particularly suitable arrangement on the wheel axle, which is suspended against the wheels by the hub spring suspension and which is connected with the frame in a yielding manner.

A separate frame, a self-supporting car body or a similar construction may be utilized as frame of the vehicle.

Further objects, features, and advantages of the present invention will become more obvious from the following description when taken in connection with the accompanying drawing which shows, for purposes of illustration only, several embodiments in accordance with the present invention, and wherein Figures 1 to 7 are schematic representations of a motor vehicle undercarriage according to the present invention in which the wheels are provided with a wheel or hub spring suspension and furthermore provision is made for additional yieldingnesses in various combinations, Figure 8 shows spring suspension diagrams for the wheel or hub spring suspension and for the additional yieldingnesses of the supplementary suspensions, Figure 9 is an axial cross-sectional view through one embodiment of the present invention provided with an additional spring suspension, which acts principally in the transverse direction, and Figures 10 to 14 show various embodiments of undercarriages with additional yieldingnesses as provided in accordance with the present invention.

Referring now to the drawing, wherein like reference characters are used throughout the various views to designate like parts, reference character $a_1$ designates in each case the front wheels, $a_2$ the rear wheels, $b_1$ a rigid front axle, $b_2$ a rigid rear axle, $c$ the undercarriage, $A_1$ and $A_2$ the hub spring suspension at the front and rear wheels respectively, $B_1$ and $B_2$ a supplementary suspension providing a yieldingness about a longitudinal axis between frame and front or rear axle respectively, $C_1$ and $C_2$ a supplementary suspension providing a yieldingness about a transverse axis between the frame and the wheel axle or an inserted shearing member $d_1$ or $d_2$. The yieldingness of $A$, $A_1$, $A_2$, $B_1$, $B_2$, and $C$, $C_1$, $C_2$ are preferably produced by rubber members, particularly rubber rings; however, the yieldingness may eventually also be achieved in another manner.

Figures 1 to 7 show the possibilities of various combinations of suspensions providing different yieldingness characteristics. In all cases illustrated herein, it is presumed that provision is made for a hub spring suspension in every wheel of the represented four-wheel motor vehicle. However, the present invention may also be applied in such a manner that only one axle of the motor vehicle is provided with a hub spring suspension.

In Figure 1, besides the hub spring suspension $A_1$ and $A_2$, provision is also made for an additional yieldingness by the supplementary suspension $B_1$ between the front axle and the frame. Instead of the front axle it would also be possible to connect the rear axle with the frame in a similar yielding manner. Under certain circumstances, such a spring suspension is sufficient for small, light or low-speed vehicles, in which a relatively larger spring suspension stroke is sufficient with only one of the two axles.

In the embodiment according to Figure 2, the rear axle $b_2$ is connected with the frame $c$ by means of a yieldingness produced by the additional, supplementary suspension $C_2$, using, for example, a torsion rod or rubber springs, about a transverse axis, which is located forwardly with respect to the center axis of the rear wheels. The rear axle $b_2$ is provided for that purpose with a bow-shaped member $b_2'$, or with appropriate shearing arms. Instead of utilizing torsion rod springs, the bow-shaped member $b_2'$ or the shearing arms can also be developed in a springy manner, for example, as leaf springs.

In the embodiment of Figure 3, both the front axle and the rear axle are supported in a yielding manner with regard to the frame, i. e., provision is made for a front yieldingness by the additional suspension $B_1$ about a longitudinal axis and for a rear yieldingness by the additional suspension $C_2$ about a transverse axis.

In Figures 4 and 5 both the front axles $b_1$ and the rear axles $b_2$ are supported at the frame $c$ by means of yielding members $B_1$, $B_2$, and $C_1$, $C_2$ respectively.

Figures 6 and 7 show arrangements, in which at least one of the rigid axles is connected with the frame $c$ in a yielding manner, both about a longitudinal axis and about a transverse axis.

In the embodiment of Figure 6 provision is made for that purpose for yielding members $B_1$ at the front axle $b_1$, and yielding members $B_2$ and $C_2$ at the rear axle.

In the embodiment of Figure 7, both the front axle and the rear axle are supported at the frame $c$ by the intermediary of a double additional yieldingness produced by supplementary suspensions $B_1$, $C_1$ and $B_2$, $C_2$ respectively, whereby a shearing member $d_1$ and $d_2$ is inserted in each case between the corresponding axle and frame.

Naturally, many further combinations of additional yieldingnesses produced by supplementary suspensions B and C together with the hub spring suspension are possible.

In Figure 8, in each case, three possible spring suspension diagrams are diagrammatically indicated, i. e., for the hub spring suspension A, for the additional yieldingness about a longitudinal axis produced by supplementary suspension B and for the additional yieldingness about a transverse axis produced by the supplementary suspension C. The curves $A'$, $B'$, $C'$ thereby illustrate linear spring suspension characteristics, the curves $A''$, $B''$, and $C''$ progressively increasing spring suspension characteristics and the curves $A'''$, $B'''$, and $C'''$ progressively decreasing spring suspension characteristics. Through combinations of one each such spring suspension with one or two spring suspensions of any other type, whereby in each case the hardness or resiliency may also be varied, practically any desired spring suspension may be achieved thereby.

Figure 9 illustrates a vertical schematic cross section through an axle, which shows, besides the hub spring suspension A, a supplementary suspension D providing an additional yieldingness between the tubular axle 18 corresponding to axle $b_1$ or $b_2$ in Figures 1 to 7 and the frame 19 corresponding to frame $c$ in Figures 1 to 7. This yieldingness is formed by rubber rings, which surround the rigid axle 18 in a ring-shaped manner and thereby produces a yieldingness between the rigid axle 18 and the frame 19, principally in a transverse direction of the vehicle, i. e., transversely to the wheels, although it also permits a certain all-directional, universal yieldingness. Shocks can also be effectively absorbed thereby, which cannot be absorbed by the hub spring suspension, without permitting the occurrence of tilting of the wheels. The axle may also be supported against the frame in the longitudinal direction by means of a shearing member (not illustrated), appropriately also made elastically. The hub spring suspension A is obtained, as also in all other cases, by annular or annularly distributed rubber elements $A_3$ and $A_4$, particularly in such a manner that the wheels $a$ are guided in their plane with regard to the wheel axle. For that purpose, for example, the hub 20 of the wheel is provided with guide washers 21 and 22 located on both sides of the intermediate disk 17 connected to the wheel rim, which serve simultaneously for the guidance or housing of support rolls or balls 23 of any suitable bearing, such as roller bearing, by means of which the wheel rim is supported against the hub in the transverse direction.

In Figure 9, the driven axle is provided with an axle differential gear 25, which is accommodated in the rigid axle casing 24 and which drives the wheel hubs 20 by means of the axle shafts 26, which are supported in the casing 18, 24. However, similar constructions can also be utilized with wheels which are not driven, such as, for example, with guided wheels.

In addition to the transverse yieldingness produced by supplementary suspension D, further suspensions B and C or only one of these two can be additionally provided for in all cases to produce additional yieldingnesses in the entire suspension. The transverse yieldingness can be applied both at the front axle and at the rear axle individually or jointly.

Figure 10:
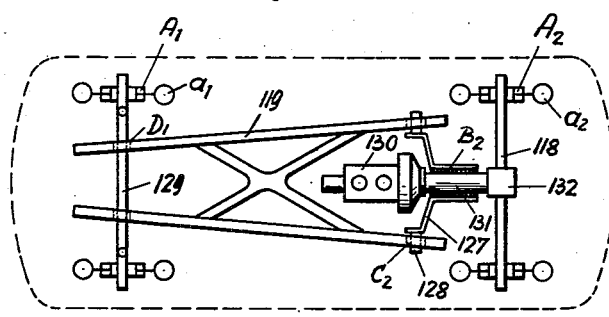

The Figure 10 shows a plan view of a somewhat more schematically illustrated embodiment of an undercarriage in accordance with the present invention, in which the rigid axle 118 corresponding to axle $b_2$ in Figures 1 to 7, which carries the rear wheels $a_2$ by means of the hub spring suspension $A_2$, is supported about a forked-shaped shearing member 127 corresponding to member $d_2$ in Figures 1 to 7 by the intermediary of an additional suspension $B_2$ supported about a longitudinal axis. The shearing member 127 in its turn is suspended at the frame about a transverse axis by means of a journal 128 and a suspension $C_2$. The front axle 129 corresponding to axle $b_1$ in Figures 1 to 7 with the steerable front wheels $a_1$, which are also supported thereon by the intermediary of a hub spring suspension $A_1$, is directly supported at the frame 119 by a supplementary suspension providing a yieldingness principally in the transverse direction of the vehicle.

The drive of the rear wheels is effected by an engine gear aggregate 130, which is rigidly connected with the axle gear casing 132 of the rear axle 118 by a tubular casing part 131 and may yield together with the rigid axle with respect to the frame. The casing part 131, which connects the engine gear aggregate 130 with the axle gear, simultaneously serves in that case as support for the rigid axle at the fork-shaped shearing member 127. The yieldingness $C_2$ can be effected again by torsion members or also in another manner, for example, by leaf springs or the like, which are supported on the axle 118 and are chucked at the frame 119.

Figure 11:
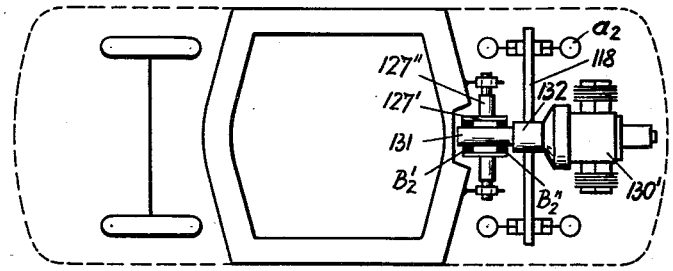

Figure 11 shows also an arrangement for the rear axle 118 as in the case of Figure 10, and is fundamentally similar thereto with respect to the yieldingness thereof. However, the engine gear aggregate 130' in that case is arranged behind the rear axle 118 instead of in front thereof and is flanged directly to the axle gear 132. The shearing member 127' in that case is formed substantially in a sleeve-shaped manner, on which the journals 127" are arranged radially, which serve for the support of the axle at the frame with a yieldingness $C_2$ acting about a transverse axis. Within the sleeve-shaped shearing member 127' the rigid axle together with the driving aggregate is supported in a yielding manner about a longitudinal axis by means of the casing extension 131, whereby, for example, provision can be made for two rubber rings $B_2'$ and $B_2''$.

Figure 12:
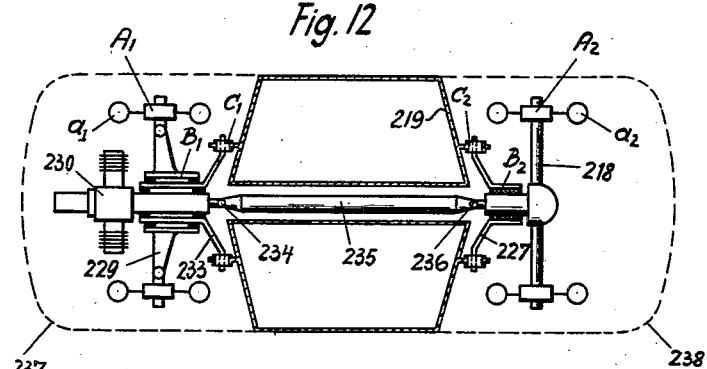

In the case of the embodiment according to Figure 12, which corresponds to the diagrammatic sketch according to Figure 7, the drive is effected by an engine gear aggregate 230, which is elastically supported at the front axle 229, i. e., within the shearing guide 233 and which drives the rear wheels $a_2$ through a joint 234, a Cardan shaft 235 and a joint 236. The Cardan shaft 235 thereby permeates the frame 219, which is united with the carriage to form a self-supporting car body, whereby the joints 234 and 235 are suitably arranged in the axis of rotation of the additional yieldingnesses or suspensions $C_1$ and $C_2$. The rear axle 218 is supported again in the shearing guide 227 with a torsional yieldingness $B_2$. The end parts of the carriage, indicated by the dotted lines 237 and 238, may support themselves on the axle members 229 and 218 and may be guided together with the latter in a movable manner with respect to the frame 219.

Figure 13:
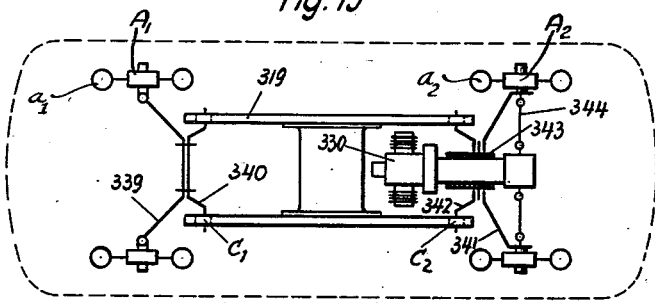

In the embodiment of Figure 13 the axles are composed of two profile-shaped parts, for example, pressed pieces 339 and 340, and 341 and 342 respectively, in such a manner that in each case a structure results, which is X-shaped, as seen in plan view, and at the one ends of which the wheels are supported by means of hub spring suspensions, while the other ends serve as yielding connection for the axle to the frame 319 by means of yieldingnesses or suspensions $C_1$ and $C_2$ respectively about transverse axes of the vehicle. The driving aggregate 330 is supported elastically in one opening of the rear wheels, for example, in rubber rings 343, and drives the rear wheels through joint shafts 344.

Figure 14:
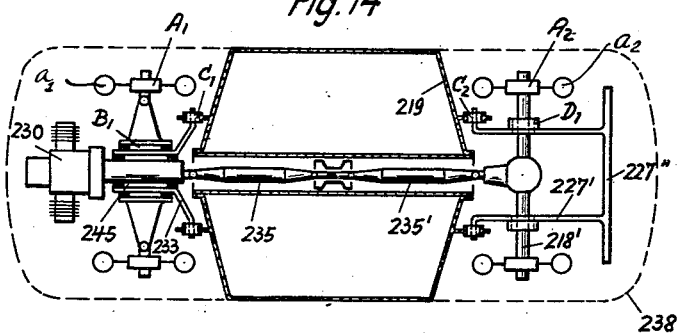

Figure 14 shows a similar arrangement as Figure 12 in which the driving aggregate 230 is supported elastically in the shearing member 233 by means of rubber buffers 245, and drives the rear axle 218' through Cardan shafts 235, 235'. In addition to the yieldingnesses of the hub spring suspensions $A_1$ and $A_2$ the yieldingnesses or suspensions $B_1$ and $C_1$ and furthermore $C_2$ are provided. The rigid axle 218', however, is arranged yieldingly, instead of about a longitudinal axis, about a transverse axis with respect to the shearing member 227' by rubber members $D_1$. The shearing member 227' is developed in a bow-shaped manner and carries a push rod 227" as well as, for example, the rear carriage hood 238. The spring suspension may in every case again be effected by torsional springs, leaf springs, helical springs, which are arranged at $C_1$ and $C_2$, or by shearing members, possess inherently elastic characteristics.

It is thus seen that the present invention provides a plurality of yieldingnesses obtained by the use of appropriate suspensions or elastic supporting means which are effectively arranged behind one another or in series between superstructure and wheel so that the entire spring load is transmitted by each of the suspensions or elastic supporting means but only a portion of the entire spring stroke falls on each individual suspension or elastic supporting means.

What I claim is:

1. In a motor vehicle a vehicle superstructure, a pair of vehicle wheels arranged at the one end of the vehicle, a pair of vehicle wheels arranged at the other end of the vehicle, one axle member each for the two pairs of vehicle wheels, elastic means each for elastically supporting each vehicle wheel in its own wheel plane with respect to the corresponding axle member, means for swingably supporting said one axle member at the vehicle superstructure, means for swingably supporting said other axle member at the vehicle superstructure, each of these two last mentioned means adapted to impart to each of the corresponding axle member a swingability relatively to the vehicle superstructure about a transverse axis of the vehicle, a driving aggregate at one axle member, means for the drive of the wheels arranged on the other axle member, shaft means extending from the driving aggregate to the last mentioned axle member comprising two driving joints, one each being substantially arranged in each of the two mentioned transverse axes of oscillation of the two axle members.

2. In a motor vehicle a vehicle superstructure, two vehicle wheels arranged opposite to each other, an axle member for both vehicle wheels, arranged substantially transversely, means for elastically supporting said axle member at the vehicle superstructure and means for elastically supporting each wheel on the axle member comprising elastic means at the wheel to spring-support said wheel substantially in its wheel plane with respect to the axle member, and a driving aggregate arranged at the axle member, said elastic supporting means being effectively arranged behind one another so that the entire spring load is transmitted by each of said elastic supporting means but only a portion of the entire spring stroke falls on each of said elastic supporting means.

3. In a motor vehicle the combination according to claim 2, wherein the axle member comprises a journal-shaped part, which runs centrally in a longitudinal direction, and the first mentioned means comprise elastic means at the journal-shaped part for supporting the same in a swingable manner substantially about a longitudinal axis of the vehicle, and furthermore comprising a driving aggregate, arranged substantially in the axis of the journal-shaped part at the axle member.

4. In a motor vehicle the combination according to claim 2, wherein the axle-member comprises a journal shaped part, which runs centrally in a longitudinal direction, and wherein the first mentioned means comprise elastic means at the journal-shaped part for supporting the same in a swingable manner substantially about a longitudinal axis of the vehicle, and furthermore comprising a driving aggregate, arranged substantially at the journal-shaped part at that side of the journal-shaped part, which is opposite to the axle member with respect to the last mentioned elastic means.

5. In a motor vehicle the combination according to claim 2, furthermore comprising a driving aggregate and elastic means for elastically supporting the same at said axle member.

6. In a motor vehicle the combination according to claim 2, wherein the first mentioned means connects the axle member with the vehicle superstructure in such a manner that the axle member can swing about a transverse axis of the vehicle with respect to the vehicle superstructure, furthermore comprising a driving aggregate and elastic means for elastic support of same at the axle member in such a manner that the driving aggregate can yield about a longitudinal axis of the vehicle with respect to the axle member.

7. In a motor vehicle a vehicle superstructure, two vehicle wheels opposite each other, an axle member for both vehicle wheels, said axle member being arranged substantially transversely, a rigid intermediate member between said vehicle superstructure and said axle member, means for yieldingly connecting said intermediate member with said vehicle superstructure to provide swinging movement of said intermediate member mainly only about one axis with respect to said vehicle superstructure, means for elastically connecting said intermediate member with said axle member to provide swinging movement of said axle member with respect to said intermediate member mainly only about an axis perpendicular to the aforementioned axis, one of said two axes extending in a longitudinal direction and the other one in a transverse direction, and means made of elastic material and located within the plane of respective wheels for elastically supporting each one of said two wheels with said axle member to spring-support each wheel substantially in the wheel plane thereof with respect to said axle member, said connecting means and said supporting means being effectively connected behind one another so that the entire spring load is transmitted by said means but only a portion of the entire spring stroke falls on each individual means.

8. In a motor vehicle the combination according to claim 7, wherein the intermediate member is connected with the axle member about a longitudinal axis of the vehicle and with the vehicle superstructure about a transverse axis in a swingable manner.

9. In a motor vehicle the combination according to claim 7, wherein the intermediate member is connected with the axle member by means of a sleeve of rubber-like material.

10. In a motor vehicle the combination according to claim 7, further comprising a driving aggregate, which is arranged at the axle member.

11. In a motor vehicle the combination according to claim 7, wherein the axle member comprises a journal-shaped part extending centrally in a longitudinal direction of the vehicle connected in a yielding manner with the intermediate member through the second mentioned means, and further comprising a driving aggregate, arranged substantially in the axis of the journal-shaped part at the axle member.

12. In a motor vehicle a vehicle superstructure, a pair of front wheels, a pair of rear wheels, one axle member for movably connecting at least the wheels of one of said wheel pair with the vehicle superstructure, elastic means for elastically supporting said axle members against said vehicle superstructure, further elastic means for elastically supporting at least the wheels of the other wheel pair in their own wheel plane relative to said vehicle superstructure, said first-mentioned elastic means providing a swingability of each of said axle members about a transverse axis of the vehicle relative to said vehicle superstructure, said first-mentioned elastic means including elastic means for elastically supporting the axle member of said one-wheel pair relative to said vehicle superstructure to provide a swingability of these parts with respect to each other mainly about a longitudinal axis.

13. In a motor vehicle a vehicle superstructure, a pair of vehicle wheels opposite each other, an axle construction supporting said wheels, elastic means for elastically supporting said axle construction at the vehicle superstructure, elastic means for elastically supporting each wheel relative to said axle construction to spring-support each wheel with respect to said axle construction in its own wheel plane, and a body part connected with said axle construction and taking part in the relative motion thereof with respect to said vehicle superstructure, said body part providing a cover for said axle construction including said wheels, said elastic means being connected effectively behind one another so that the entire spring load is transmitted by each of said elastic means but only a portion of the entire spring stroke falls on each of said elastic means.

14. In a motor vehicle, a vehicle superstructure, a pair of opposite vehicle wheels opposite to each other, an axle construction carrying said wheels, means for elastically supporting said axle construction at the vehicle superstructure, elastic means for elastically supporting each wheel relative to said axle construction to spring-support each wheel in its own wheel plane with respect to said axle construction, said elastic means comprising a hub part supported by said axle construction and rotating with the wheel including two disks spaced from each other at an axial distance, an intermediate disk connected with said wheel, rubber-like rings between said disks and connected therewith against radial displacement to absorb the forces acting in the wheeling plane as shearing strain, and support members between said disks to absorb axial forces in a substantially rigid manner and to guide said disks in the wheel plane towards each other.

15. In a motor vehicle a vehicle superstructure, two vehicle wheels opposite each other, an axle member for both vehicle wheels, said axle member being arranged substantially in a transverse manner, a rigid intermediate member between said vehicle superstructure and said axle member, means for yieldingly connecting said intermediate member with said vehicle superstructure to provide swinging movement of said intermediate member mainly only about one axis with respect to said vehicle superstructure, means for elastically connecting said intermediate member with said axle member to provide swinging movement of said axle member with respect to said intermediate member mainly only about an axis perpendicular to the aforementioned axis, and wherein one of said two axes runs in a longitudinal direction and the other one runs in a transverse direction, and means made of elastic material and located within the plane of respective wheels for elastically supporting each one of said two wheels with said axle member to spring-support each wheel substantially in the wheel plane thereof with respect to said axle member, and means for non-yieldingly supporting said wheels in a transverse direction relative to said axle member, said connecting means and said elastic supporting means being effectively connected behind one another so that the entire spring load is transmitted by each of said means but only a portion of the entire spring stroke falls on each individual means.

16. In a motor vehicle a vehicle superstructure, two vehicle wheels arranged opposite to each other, an axle member for both vehicle wheels arranged substantially transversely, means for elastically supporting the axle member at the vehicle superstructure, and means for elastically supporting each wheel on said axle member comprising elastic means at the wheel to spring-support said wheel substantially in its wheel plane with respect to said axle member, a driving aggregate arranged at said axle member, and means for non-yieldingly supporting said wheels in a transverse direction of the vehicle against said axle member.

17. In a motor vehicle a vehicle superstructure, two vehicle wheels arranged opposite to each other, an axle member for both vehicle wheels arranged substantially transversely, means for elastically supporting the axle member at the vehicle superstructure, and means for elastically supporting each wheel on said axle member comprising elastic means at the wheel to spring-support said wheel substantially in its wheel plane with respect to said axle member, and means for non-yieldingly supporting said wheels in a transverse direction of the vehicle against said axle member, said elastic connecting means being formed of rubber members.

18. In a motor vehicle a vehicle superstructure, two vehicle wheels arranged opposite to each other, an axle member for both vehicle wheels arranged substantially transversely, means for elastically supporting the axle member at the vehicle superstructure, and means for elastically supporting each wheel on said axle member comprising elastic means at the wheel to spring support said wheel substantially in its wheel plane with respect to said axle member and means including roller bearing means for non-yieldingly supporting said wheels in a transverse direction of the vehicle against said axle member, said elastic connecting means being formed of rubber members.

References Cited in the file of this patent
UNITED STATES PATENTS 1,047,886    Clark                 Dec. 17, 1912

(Other references on following page)

UNITED STATES PATENTS

| | | | |
|---|---|---|---|
| 1,684,596 | Patch | Sept. 18, | 1928 |
| 1,948,745 | Curtiss | Feb. 27, | 1934 |
| 2,013,599 | Butler | Sept. 3, | 1935 |
| 2,048,959 | Thompson | July 28, | 1936 |
| 2,056,219 | Stout | Oct. 6, | 1936 |
| 2,090,561 | Wagner | Aug. 17, | 1937 |
| 2,286,609 | Ledwinka | June 16, | 1942 |
| 2,304,847 | Piron | Dec. 15, | 1942 |
| 2,525,988 | Willson | Oct. 17, | 1950 |

FOREIGN PATENTS

| | | | |
|---|---|---|---|
| 865,508 | France | Feb. 24, | 1924 |